US012798150B2

(12) United States Patent
Ito et al.

(10) Patent No.: US 12,798,150 B2
(45) Date of Patent: Nov. 17, 2026

(54) EXTRUSION MOLDING MACHINE AND METHOD FOR PRODUCING MOLDED BODY

(71) Applicant: NGK INSULATORS, LTD., Nagoya-City (JP)

(72) Inventors: Keita Ito, Nagoya-City (JP); Yuichi Tajima, Nagoya-City (JP); Yoshimasa Kondo, Nagoya-City (JP)

(73) Assignee: NGK INSULATORS, LTD., Nagoya (JP)

( * ) Notice: Subject to any disclaimer, the term of this patent is extended or adjusted under 35 U.S.C. 154(b) by 309 days.

(21) Appl. No.: 17/445,851

(22) Filed: Aug. 25, 2021

(65) Prior Publication Data

US 2022/0111555 A1 Apr. 14, 2022

(30) Foreign Application Priority Data

Oct. 12, 2020 (JP) ................................ 2020-172208

(51) Int. Cl.
*B28B 3/26* (2006.01)
*B28B 3/20* (2006.01)

(52) U.S. Cl.
CPC ............ *B28B 3/2654* (2013.01); *B28B 3/206* (2013.01); *B28B 3/269* (2013.01); *B28B 2003/203* (2013.01)

(58) Field of Classification Search
CPC ....... B28B 3/206; B28B 3/2654; B28B 3/269; B28B 2003/203
See application file for complete search history.

(56) References Cited

U.S. PATENT DOCUMENTS

| | | | | |
|---|---|---|---|---|
| 2,702,408 A * | 2/1955 | Hartland | B29C 48/06 | 425/197 |
| 2,897,541 A * | 8/1959 | Camillo | B29C 48/313 | 425/197 |
| 4,913,863 A * | 4/1990 | Burrafato | B29C 48/06 | 264/177.17 |
| 12,097,638 B2 * | 9/2024 | Ito | B29C 48/11 | |
| 2002/0014710 A1 | 2/2002 | Tsuruta et al. | | |

(Continued)

FOREIGN PATENT DOCUMENTS

| | | | |
|---|---|---|---|
| CN | 107498817 A | 12/2017 | |
| CN | 110103350 A * | 8/2019 | B29B 9/06 |

(Continued)

OTHER PUBLICATIONS

English translation of CN 110103350, Aug. 9, 2019. (Year: 2019).*

(Continued)

*Primary Examiner* — Xiao S Zhao
*Assistant Examiner* — Joseph S Leyson
(74) *Attorney, Agent, or Firm* — Muncy, Geissler, Olds & Lowe, P.C.

(57) ABSTRACT

An extrusion molding machine includes a molding portion having one end and other end, the one end having a die, the other end being connected to an extrusion port of an extrusion portion, the molding portion also including a screen arranged therein. The molding portion includes: two or more temperature controlling members between the screen and the die; and a heat insulating member arranged between the two or more temperature controlling members.

7 Claims, 3 Drawing Sheets

(56) References Cited

U.S. PATENT DOCUMENTS

| | | | | |
|---|---|---|---|---|
| 2002/0167102 | A1* | 11/2002 | Yamaguchi | B28B 3/2654 264/211.21 |
| 2008/0102146 | A1 | 5/2008 | Yamazaki | |
| 2014/0151915 | A1 | 6/2014 | Sariego et al. | |
| 2016/0001460 | A1* | 1/2016 | Tajima | B29C 48/302 264/176.1 |

FOREIGN PATENT DOCUMENTS

| | | | |
|---|---|---|---|
| DE | 10 2007 000 610 | A1 | 5/2008 |
| DE | 101 31 692 | B4 | 3/2017 |
| JP | 2001-260116 | A | 9/2001 |
| JP | 2013-193278 | A | 9/2013 |
| JP | 2013-240940 | A | 12/2013 |
| JP | 6258962 | B2 | 1/2018 |

OTHER PUBLICATIONS

German Office Action (with English translation) dated Apr. 19, 2024 (Application No. 10 2021 209 963.7).

Chinese Office Action (with English translation) dated Mar. 15, 2024 (Application No. 202110822392.X).

Japanese Office Action (with English translation) dated Jul. 25, 2023 (Application No. 2020-172208).

* cited by examiner

| | | Example 1 | Example 2 | Reference Example 1 | ComparativeExample 1 |
|---|---|---|---|---|---|
| Temperature (°C) | Temperature Controlling Member 23a | 35 | 35 | 40 | -- |
| | Temperature Controlling Member 23b | 40 | 40 | 40 | -- |
| | Temperature Controlling Member 23c | -- | 40 | 40 | -- |
| Temperature Distribution | 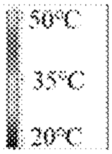 | 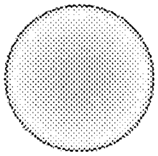 | 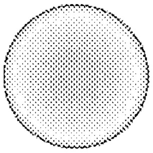 | 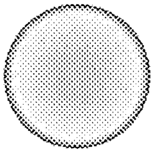 | 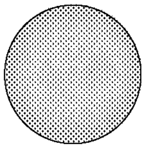 |
| Dimensional Accuracy | Schematic View of End Face (End Face is on Right Side) | 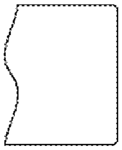 | 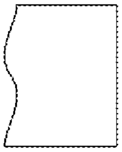 | 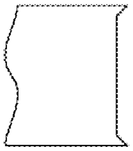 | 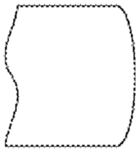 |
| | Convex Amount (mm) | 0.1 | 0 | 1.0 | 5.0 |
| Surface Property (Presence or Absence of Surface Defects) | | Absent | Absent | Present | Absent |

FIG. 5

EXTRUSION MOLDING MACHINE AND METHOD FOR PRODUCING MOLDED BODY

FIELD OF THE INVENTION

The present invention relates to an extrusion molding machine and a method for producing a molded product.

BACKGROUND OF THE INVENTION

Extrusion molding machines are used for producing various molded bodies. For example, in the production of a honeycomb-shaped ceramic structure used for a catalyst support for purifying an automobile exhaust gas, a diesel particulate filter (DPF), a gasoline particulate filter (GPF), a heat storage body for a combustion device, and the like, a honeycomb-shaped ceramic molded body is mainly produced using an extrusion molding machine in terms of productivity.

By the way, a ceramic structure used for applications such as DPFs and GPFs tends to cause problems such as cracking due to thermal stress or the like, if the ceramic structure has low dimensional accuracy. Therefore, high dimensional accuracy is also required for a ceramic molded body before firing.

As a technique for improving dimensional accuracy of a molded body obtained by an extrusion molding machine, for example, Patent Literature 1 proposes a technique for improving dimensional accuracy of a molded body by controlling a molding rate of the molded body by arranging a heating element to a front section adjacent to an extrusion mold to control a temperature of a ceramic batch material (molding material).

Further, Patent Literature 2 proposes a technique for improving dimensional accuracy of a molded body by arranging a plurality of pines in a resistance tube between a rectifying board and a die (mold) of an extrusion molding machine, each of the pines being provided to penetrate a tube wall of the resistance tube, and having a changeable length protruding inward of the resistance tube, and controlling a temperature of the pins to provide a uniform extrusion rate of a raw material composition (molding material) introduced into the die.

CITATION LIST

Patent Literatures

[Patent Literature 1] Japanese Patent No. 6258962 B
[Patent Literature 2] Japanese Patent Application Publication No. 2013-193278 A

SUMMARY OF THE INVENTION

The present invention relates to an extrusion molding machine comprising a molding portion having one end and other end, the one end having a die, the other end being connected to an extrusion port of an extrusion portion, the molding portion also comprising a screen arranged therein, wherein the molding portion comprises: two or more temperature controlling members between the screen and the die; and a heat insulating member arranged between the two or more temperature controlling members.

Further, the present invention relates to a method for producing a molded body by extruding a molding material using the extrusion molding machine, wherein the method comprises:

controlling the two or more temperature controlling members between the screen and the die to different temperatures.

BRIEF DESCRIPTION OF THE DRAWINGS

FIG. 5 shows the evaluation results for Example 1, Example 2, Reference Example 1 and Comparative Example 1a schematic view of the end face of the molded body.

DETAILED DESCRIPTION OF THE INVENTION

Figure 1:
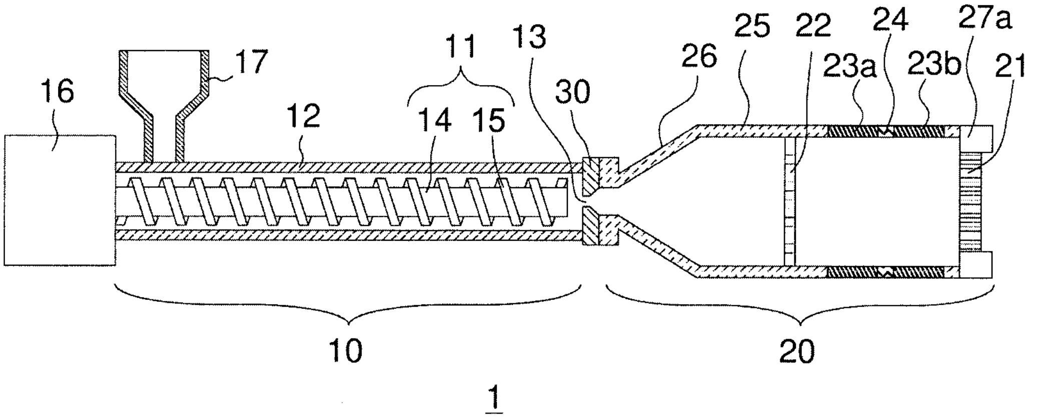
FIG. 1 is a schematic view showing a schematic structure of an extrusion molding machine according to Embodiment 1 of the present invention.

The technique disclosed in Patent Literature 1 requires many devices for temperature control of the molding material. Therefore, the devices become large and complicated. Further, when heating the molding material, an amount of electricity increases, so that the production cost also increases.

The technique disclosed in Patent Literature 2, an extrusion pressure has to be increased in order to ensure the specific extrusion rate, because the pins obstruct the flow of the molding material. Further, a contact area between the pins and the molding material is lower, so that it takes time to control the temperature by the pins.

Thus, the conventional techniques for improving the dimensional accuracy of the molded body have various problems as described above. Therefore, there is a need for development of another technique for producing a molded body with high dimensional accuracy.

Further, all of the techniques disclosed in Patent Literatures 1 and 2 have a problem that it is difficult to control a surface property of the molded body and wrinkles and cracks tend to be generated on the surface of the molded body.

The present invention has been made to solve the above problems. An object of the present invention is to provide an extrusion molding machine that can produce a molded product having high dimensional accuracy and an improved surface property.

Another object of the present invention is to provide a method for producing a molded body having high dimensional accuracy and an improved surface property.

As a result of intensive studies for an extrusion molding machine including a molding portion which has a die at one end, the other end being connected to an extrusion port of an extrusion portion, and which has a screen arranged therein, the present inventors have found that a temperature control in a region between the screen and the die is closely related to the dimensional accuracy and surface property of the molded body. Further, the present inventors have found that the above problems can be solved by providing two or more temperature controlling members between the screen and the die and arranging a heat insulating member between the two or more temperature controlling members, and have completed the present invention.

According to the present invention, it is possible to provide an extrusion molding machine that can produce a molded body having high dimensional accuracy and an improved surface property.

Further, according to the present invention, it is possible to provide a method for producing a molded body having high dimensional accuracy and an improved surface property.

Hereinafter, embodiments according to the present invention will be specifically described. It is to understand that the present invention is not limited to the following embodiments, and various modifications and improvements, which will be within the scope of the present invention, may be made based on ordinary knowledge of a person skilled in the art, without departing from the spirit of the present invention.

Embodiment 1

FIG. 1 is a schematic view showing a schematic structure of an extrusion molding machine according to Embodiment 1 of the present invention.

As shown in FIG. 1, an extrusion molding machine 1 according to Embodiment 1 of the present invention includes: an extrusion portion 10; and a molding portion 20 connected to the extrusion portion 10.

The extrusion portion 10 is not particularly limited as long as it has a structure capable of extruding a molding material into the molding portion 20.

The molding portion 20 has a die 21 at one end, and the other end is connected to an extrusion port 13 of the extrusion portion 10, and a screen 22 is arranged in the interior of the molding portion 20. Further, the molding portion 20 has two or more temperature controlling members 23*a*, 23*b* between the screen 22 and the die 21, and a heat insulating member 24 is arranged between the two or more temperature controlling members 23*a* and 23*b*. It should be noted that FIG. 1 shows that, as an example, the two temperature controlling members 23*a*, 23*b* are provided between the screen 22 and the die 21. The two temperature controlling members 23*a*, 23*b* are configured so that the temperature can be individually adjusted, and they can be controlled to different temperatures.

In the extrusion molding machine 1 having the above structure, the temperature controlling member 23*a* on the upstream side arranged between the screen 22 and the die 21 can improve uniformity of a temperature distribution of a cross section orthogonal to an extrusion direction of a molding material (in particular, a temperature of the molding material on a central side and a temperature of the molding material on an outer peripheral side). This can lead to the same degree of flow rates of the molding material on the central side and of the molding material on the outer peripheral side, so that it will be difficult for uneven portions to be formed on end faces of a molded body, and dimensional accuracy of the molded body can be improved.

As used herein, the "molding material on a central side" refers to the molding material located in a region between a central portion and a portion of ½ of a distance from the central portion to the outermost circumference in a cross section orthogonal to the extrusion direction of the molding material. Further, the molding material on the outer peripheral side refers to the molding material located in a region from the central portion, beyond a portion of ½ of the distance, to the outermost circumference in the cross section orthogonal to the extrusion direction of the molding material.

On the other hand, a portion of several mm from the outermost circumference of the molding material on the outer peripheral side is susceptible to the temperature of the temperature controlling member 23*a* on the upstream side, so that the portion tends to generate a temperature difference from the other portion. As a result, the flow rate of the molding material in that portion is not equal to the flow rate in the other portion, so that a surface property of the molded body may be deteriorated (for example, wrinkles or cracks are generated). Therefore, the temperature of the portion of several mm from the outermost circumference can be controlled by the temperature controlling member 23*b* on the downstream side arranged between the screen 22 and the die 21, thereby improving the surface property of the molded body.

The set temperatures of the temperature controlling members 23*a*, 23*b* on the upstream side and the downstream side may vary depending on the size of the molded body to be produced (particularly, a diameter of the cross section orthogonal to the extrusion direction) and characteristics of the molding material to be used. For example, by setting the temperature of the temperature controlling member 23*a* on the upstream side to a higher temperature than that of the molding material on the center side, the uniformity of the temperature distribution in the cross section orthogonal to the extrusion direction of the molding material tends to be improved. However, a lower difference between the temperatures of the molding material on the outer peripheral side and the molding material on the center side may provide that effect. Therefore, depending on the size of the molded body to be produced and characteristics of the molding material to used, the set temperature of the temperature controlling members 23*a* on the upstream side should be controlled.

Further, the set temperature of the temperature controlling member 23*b* on the downstream side is the same as that of the temperature controlling member 23*a* on the upstream side. However, by setting the set temperature to a higher temperature than that of the temperature controlling member 23*a* on the upstream side, the deterioration of the surface property the molded body tends to be easily suppressed.

Hereinafter, members forming the extrusion molding machine 1 according to Embodiment 1 of the present invention will be described in detail.

(Extrusion Portion 10)

The extrusion portion 10 is not particularly limited as long as it has a screw 11 and a barrel 12 capable of housing the screw 11, and extrusion portions known in the art may be used.

The screw 11 preferably has a screw shaft 14 and a blade portion 15 formed spirally along the screw shaft 14.

Further, the screw 11 may preferably be a biaxial screw that rotates in the same direction, and more preferably a meshing type biaxial screw, in terms of kneadability of the molding material, particularly a ceramic molding material. In this case, a pair of screws 11 are arranged parallel to each other in the barrel 12.

A base portion of the screw 11 is connected to a drive device 16. The drive device 16 includes a motor and a gearbox (not shown), and rotates the screw 11 while controlling a rotation speed so as to obtain a predetermined extrusion pressure.

The upstream side of the extrusion portion 10 is provided with a material input portion 17 for feeding the molding material into the extrusion portion 10. The molding material fed from the material input portion 17 is kneaded by the screw 11 and fed to the molding portion 20.

(Molding Portion 20)

The molding portion 20 includes a drum 25 having a space therein, and one end of the drum 25 has the die 21, and the other end is connected to the extrusion port 13 of the extrusion portion 10.

A shape of the drum 25 is not particularly limited, and a part of the drum 25 may include a diameter decreased part or a diameter increased part. For example, as shown in FIG. 1, the drum 25 has a diameter increased part 26 on the extrusion port 13 side. The drum 25 having such a structure may be composed of a single member, or a plurality of members. When the drum 25 is composed of a plurality of members, the drum 25 can be obtained by combining a diameter increased drum with a straight drum.

A shape of the die 21 is not particularly limited, and it may be appropriately set depending on the shape of the molded body to be produced. For example, when producing a molded body having a honeycomb shape, the die 21 having slits corresponding to a thickness of each partition wall of the honeycomb molded body may be used.

The die 21 is held by a die holding member 27*a*. The die holding member 27*a* is arranged such that the die 21 is located at one end of the molding portion 20.

The die holding member 27*a* is not particularly limited, and a member known in the art may be used.

The screen 22 (filtration net) arranged inside the drum 25 (molding portion 20) is made of a mesh-shaped material, which can remove coarse particles or other impurities mixed in the molding material, and stabilize the molding material fed to the die 21.

The temperature controlling members 23*a*, 23*b* are not particularly limited, and those known in the art may be used. In particular, temperature controlling drums through which a fluid can flow can preferably be used as the temperature controlling members 23*a*, 23*b*. The temperature controlling drums can control the temperature by adjusting a temperature of the fluid. Therefore, they can reduce consumption of electricity as compared with the case where heating means such as heating elements or cooling means such as cooling elements are used. For example, hot water heated by using boilers or the like can be circulated through the temperature controlling drums, thereby easily and efficiently heating the molding material. Further, cold water cooled by using chillers or the like can be circulated through the temperature controlling drums, thereby easily and efficiently cooling the molding material.

Figure 2:
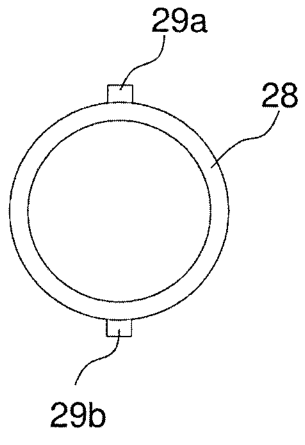
FIG. 2 is a front view of a temperature controlling drum as viewed from an extrusion portion side.

Here, FIG. 2 shows a front view of the temperature controlling drum as viewed from the extrusion portion 10 side. As shown in FIG. 2, the temperature controlling drum 28 has a fluid feed port 29*a* and a fluid discharge port 29*b*, and forms a fluid flow path in a circumferential direction. Although not shown, the feed port 29*a* and the discharge port 29*b* are connected to a fluid feed device via a tube or the like. By circulating the fluid while controlling the temperature of the fluid by the feed device, the temperature can be easily controlled.

The total number of the temperature controlling members 23*a*, 23*b* arranged between the screen 22 and the die 21 is not particularly limited as long as it is two or more, and it may preferably be from 2 to 5, and more preferably from 2 to 4, and further preferably from 2 to 3. The total number of the temperature controlling members 23*a*, 23*b* of 2 or more can allow both the dimensional accuracy and the surface property of the molded body to be improved. As the total number of the temperature controlling members 23*a*, 23*b* is lager, the effect of improving the dimensional accuracy and the surface property of the molded body is higher. However, in view of production costs and the like, it would be realistic that the total number of the temperature controlling members 23*a*, 23*b* is 5 or less.

The heat insulating member 24 may preferably have a thermal conductivity of 0.5 W/m·K or less, although not particularly limited thereto. The heat insulating member 24 having such a thermal conductivity can sufficiently ensure the heat insulating effect between the temperature controlling members 23*a*, 23*b*. In addition, a lower thermal conductivity of the heat insulating member 24 is preferable, because it provides a higher heat insulating effect. However, the lower limit of the thermal conductivity is 0.02 W/m·K in view of available materials. Further, as used herein, the "thermal conductivity" refers to a thermal conductivity measured at 25° C.

A material of the heat insulating member 24 is not particularly limited as long as it has heat insulating properties. Preferably, the heat insulating member is made of a heat insulating resin.

The heat insulating resin is not particularly limited, and resins known in the art may be used. Examples of the heat insulating resin include synthetic resins such as polyacetal resins, polyamide resins, polyethylene resins, and polypropylene resins.

(Rectifying Board 30)

A rectifying board 30 may optionally be arranged between the extrusion portion 10 and the molding portion 20. The rectifying board 30 has through holes and has a function of adjusting the behavior of the molding material.

The number, position and shape of the through holes are not particularly limited, and they may be set as needed.

A material of the rectifying board 30 may be an iron-based material, stainless steel-based material, or the like, although not particularly limited thereto.

It should be noted that the outer circumference of the drum 25 (molding portion 20) may be covered with a heat insulating sheet (not shown). Such a configuration can allow a constant temperature to be maintained in the drum 25, so that the uniformity of the temperature distribution of the molding material in the cross section orthogonal to the extrusion direction of the molding material can be improved, and the effect of improving the dimensional accuracy of the molded body can be enhanced.

The extrusion molding machine 1 having the above structure can be used for producing a molded body. In particular, the extrusion molding machine 1 is suitable for use in producing a ceramic molded body with a ceramic molding material, particularly a ceramic honeycomb molded body.

A typical method for producing a molded body is to extrude the molding material using the extrusion molding machine 1, and includes the step of controlling the two or more temperature controlling members 23*a*, 23*b* between the screen 22 and the die 21 to different temperatures.

By controlling the temperature controlling member 23*a* on the upstream side of the two or more temperature controlling members 23*a*, 23*b* to a specific temperature, the uniformity of the temperature distribution of the molding material in the cross section orthogonal to the extrusion direction of the molding material can be improved, so that the dimensional accuracy of the molded body can be improved. Further, by controlling the temperature controlling member 23*b* on the downstream side of the two or more temperature controlling members 23*a*, 23*b* to a temperature different from that of the temperature controlling member 23*a* on the upstream side, the temperature of the portion of several mm from the outermost circumference can be controlled, thereby improving the surface property of the molded body.

In a specific method for producing the molded body, first, the molding material is fed from the material input portion 17 to the interior of the barrel 12. The molding material is kneaded while being subjected to a shearing force by the rotation of the screw 11, and is conveyed to the extrusion port 13 side at the tip of the barrel 12. The molding material extruded from the extrusion port 13 of the barrel 12 passes through the through holes of the rectifying board 30, passing through the screen 22, and is fed to the die 21 while being temperature-controlled by the two or more temperature controlling members 23*a*, 23*b*. The molding material is then extruded through the die 21 to obtain a molded body having a desired shape.

The molding material used in the method for producing the molded body is not particularly limited. For example, a ceramic molding material may be used. The ceramic molding material includes ceramic raw materials. Examples of ceramic raw materials include cordierite-forming raw materials, cordierite, silicon carbide, silicon-silicon carbide composite materials, mullite, aluminum titanate, and the like. The cordierite-forming raw material refers to a ceramic raw material blended so as to have a chemical composition where silica is in a range of from 42 to 56% by mass, alumina is in a range of from 30 to 45% by mass, and magnesia is in a range of from 12 to 16% by mass. Then, the cordierite-forming raw material is fired to form cordierite.

The ceramic molding material may optionally contain a dispersion medium, an organic binder, an inorganic binder, a pore former, a surfactant, and the like, in addition to the ceramic raw materials. Those components are not particularly limited, and those known in the art may be used.

Embodiment 2

An extrusion molding machine according to Embodiment 2 of the present invention is the same as the extrusion molding machine 1 according to Embodiment 1 of the present invention, with the exception that the die holding member has a temperature control function. Therefore, here, the descriptions of the configurations common to those of the extrusion molding machine 1 will be omitted, and only different configurations will be described.

Figure 3:
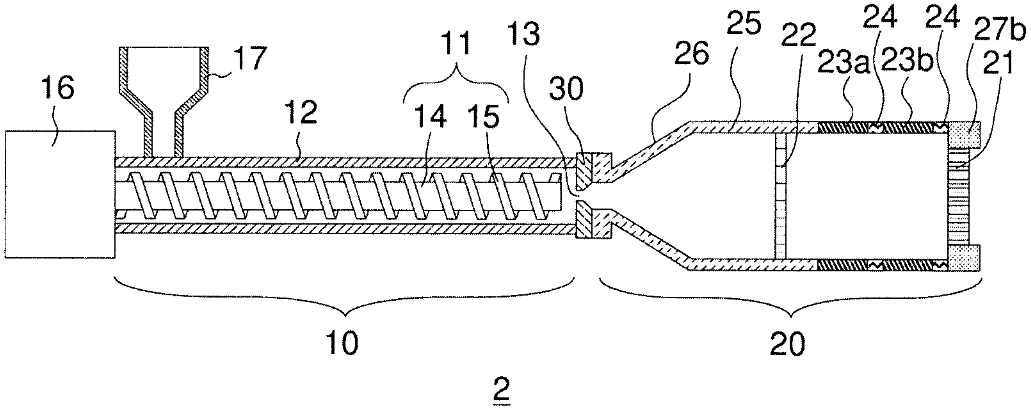
FIG. 3 is a schematic view showing a schematic structure of an extrusion molding machine according to Embodiment 2 of the present invention.

FIG. 3 is a schematic view showing a schematic structure of an extrusion molding machine according to Embodiment 2 of the present invention.

As shown in FIG. 3, an extrusion molding machine 2 according to Embodiment 2 of the present invention has a die holding member 27*b* which holds a die 21 and can control the temperature.

In the extrusion molding machine 1 according to Embodiment of the present invention, the surface property of the molded body is improved by controlling the temperature of the portion of several mm from the outermost circumference by the temperature controlling member 23*b* on the downstream side. However, the surface property of the molded body may not be sufficiently improved only by the temperature control by the temperature controlling member 23*b* on the downstream side.

Therefore, in the extrusion molding machine 2 according to Embodiment 2 of the present invention, the surface property of the molded body can be stably improved by controlling the temperature of the portion of several mm from the outermost circumference by the die holding member 27*b* located downstream of the temperature controlling member 23*b* on the downstream side.

A structure of the die holding member 27*b* that can control the temperature is not particularly limited, and the temperature can be controlled by forming a structure through which a fluid can flow, as in the case of the temperature controlling drum 28 as described above. Further, the temperature of the die holding member 27*b* may be controlled by attaching a heating means such as a heating element to the outer circumference of the general die holding member 27*b*.

Between the die holding member 27*b* and the temperature controlling member 23*b* on the most downstream side may optionally be the heat insulating member 24. Such a configuration can allow a sufficient heat insulating effect to be ensured between the die holding member 27*b* and the temperature controlling member 23*b* on the most downstream side.

When the die holding member 27*b* that can control the temperature is used, it is preferable that the die holding member 27*b* is controlled to the same temperature as that of the temperature controlling member 23*b* on the most downstream side. Such a control can allow the surface property of the molded body to be stably improved.

Embodiment 3

An extrusion molding machine according to Embodiment 3 of the present invention is the same as the extrusion molding machine 1 according to Embodiment 1 of the present invention, with the exception that the temperature controlling member is arranged in the diameter increased part 26 of the molding portion 20. Therefore, here, the descriptions of the configurations common to those of the extrusion molding machine 1 will be omitted, and only different configurations will be described.

Figure 4:
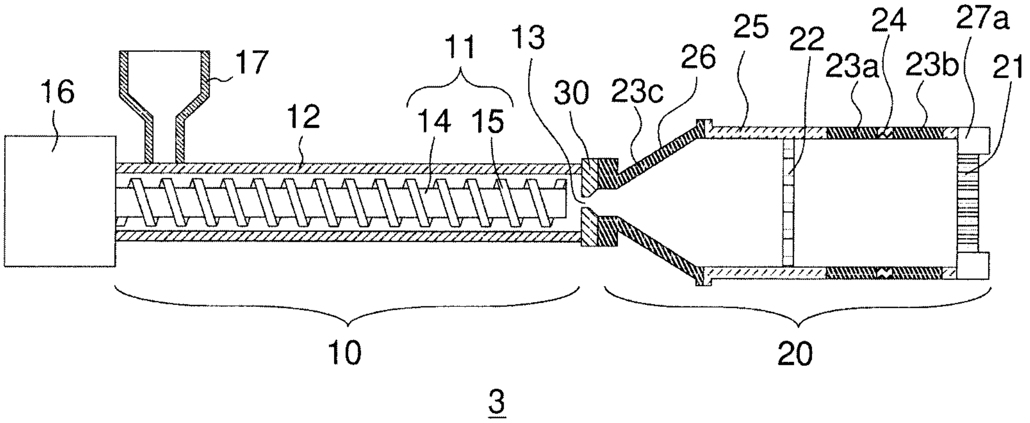
FIG. 4 is a schematic view showing a schematic structure of an extrusion molding machine according to Embodiment 3 of the present invention.

FIG. 4 is a schematic view showing a schematic structure of an extrusion molding machine according to Embodiment 3 of the present invention.

As shown in FIG. 4, an extrusion molding machine 3 according to Embodiment 3 of the present invention has the diameter increased part 26 between the other end of the molding portion 20 and the screen 22, and the diameter increased part 26 is provided with a temperature controlling member 23*c*.

In the extrusion molding machine 1 according to Embodiment 1 of the present invention, the temperature controlling member 23*a* on the upstream side can improve the uniformity of the temperature distribution in the cross section orthogonal to the extrusion direction of the molding material, thereby improving the dimensional accuracy of the molded body. However, the dimensional accuracy of the molded body may not be sufficiently improved only by the temperature controlling member 23*a* on the upstream side.

Therefore, in the extrusion molding machine 3 according to Embodiment 3 of the present invention, the temperature is controlled by the temperature controlling member 23*c* of the diameter increased part 26 located upstream of the temperature controlling member 23*a* on the upstream side, so that the dimensional accuracy of the molded body can be stably improved.

The temperature controlling member 23*c* of the diameter increased part 26 is not particularly limited, and a temperature controlling drum having the same function as that of the temperature controlling drum 28 as described above can be used.

When the temperature controlling member 23*c* of the diameter increased part 26 is used, the temperature controlling member 23*c* can preferably control the temperature to the same temperature as that of the temperature controlling member 23*a* on the most upstream side arranged between the screen 22 and the die 21. Such a control can allow the dimensional accuracy of the molded body to be stably improved.

While the configurations different from those of the extrusion molding machine 1 according to Embodiment 1 of the present invention have been described above, the different configurations may also be applied to the extrusion molding machine 2 according to Embodiment 2 of the present invention. Needless to say, the effects as described above can be obtained in this case as well.

EXAMPLES

Hereinafter, the present invention will be described in more detail with reference to Examples, but the present invention is not limited to these Examples.

Example 1

The extrusion molding machine 1 as shown in FIG. 1 was produced. Temperature controlling drums were used for the temperature control members 23*a*, 23*b*, and a polyacetal resin (heat insulating resin) having a thermal conductivity of 0.25 W/m·K was used for the heat insulating member 24 between the two temperature controlling members 23*a*, 23*b*.

Subsequently, in the extrusion molding machine 1, the temperature controlling members 23*a*, 23*b* were set to the temperatures as shown in FIG. 5. A ceramic molding material containing cordierite was used as the ceramic raw material, a pillar shaped ceramic honeycomb molded body (a diameter of the cross section orthogonal to the extrusion direction of 196 mm) was extruded in an amount of the molding material fed of 300 kg/h and at a rotation speed of the screw 11 of 55 rpm, and evaluated as described below.

Example 2 and Reference Example 1

The extrusion molding machine 3 as shown in FIG. 4 was produced. Temperature controlling drums were used for the temperature controlling members 23*a*, 23*b*, 23*c*, and a polyacetal resin (heat insulating resin) having a thermal conductivity of 0.25 W/m·K was used for the heat insulating member 24 between the two temperature controlling members 23*a*, 23*b*.

Subsequently, in the extrusion molding machine 3, the temperature controlling members 23*a*, 23*b*, 23*c* were set to the temperatures as shown in FIG. 5. A pillar shaped ceramic honeycomb molded body was then extruded under the same conditions as those of Example 1, and evaluated as described below.

Comparative Example 1

An extrusion molding machine having the same structure as that described above was produced, with the exception that the temperature controlling members 23*a*, 23*b*, and 23*c* were not provided.

Subsequently, in the extrusion molding machine, a pillar shaped ceramic honeycomb molded body was extruded under the same conditions as those of Example 1, and evaluated as described below.

(Temperature Distribution of Molded Body)

The temperature distribution of the cross section orthogonal to the extrusion direction of the ceramic honeycomb molded body immediately after being discharged from the die 21 was measured using an infrared thermography camera (Thermo GEAR G120EX from Nippon Avionics Co., Ltd.). The results are shown in FIG. 5.

(Dimensional Accuracy of Molded Body)

After cutting each ceramic honeycomb molded body discharged from the die 21 in the direction orthogonal to the extrusion direction, each cut surface was photographed from a direction perpendicular to the extrusion direction to evaluate the end face shape of the molded body. For the results, FIG. 5 shows a schematic view of the end face shape of the molded body. In the schematic view, each end face is on the right side. Further, for the end face shape of each molded body, a convex amount was measured by drawing a straight line connecting the two outer peripheral end face portions and determining the distance of the convex portion protruding with respect to the straight line. The results are also shown in FIG. 5.

(Surface Property of Molded Body)

The surface of each ceramic honeycomb molded body immediately after being discharged from the die 21 was visually observed, and the presence or absence of surface defects such as wrinkles and cracks was evaluated. The results are shown in FIG. 5.

As shown in FIG. 5, the extrusion molding machines 1 and 3 each provided with the temperature controlling members 23*a*, 23*b* were able to produce molded bodies each having higher dimensional accuracy and an improved surface property (Examples 1 and 2). In particular, the extrusion molding machine 3 further provided with the temperature controlling member 23*c* was able to produce a molded body having a smaller convex amount and higher dimensional accuracy (Example 2).

On the other hand, the extrusion molding machine that was not provided with the temperature controlling members 23*a*, 23*b* did not have sufficient dimensional accuracy of the molded body (Comparative Example 1).

It was also found that when the temperature of the molding portion 20 was constant, the surface property was deteriorated (Reference Example 1).

As can be seen from the above results, according to the present invention, it is possible to provide an extrusion molding machine that can produce a molded body having higher dimensional accuracy and an improved surface property. Further, according to the present invention, it is possible to provide a method for producing a molded body having higher dimensional accuracy and an improved surface property.

DESCRIPTION OF REFERENCE NUMERALS

1, 2, 3 extrusion molding machine
10 extrusion portion
11 screw
12 barrel
13 extrusion port
14 screw shaft
15 screw portion
16 drive device
17 material input portion
20 molding portion
21 die

22 screen
23*a*, 23*b*, 23*c* temperature controlling member
24 heat insulating member
25 drum
26 diameter increased part
27*a*, 27*b* die holding member
28 temperature controlling drum
29*a* feed port
29*b* discharge port

The invention claimed is:

1. An extrusion molding machine comprising a molding portion having one end and other end, the one end having a die, the other end being connected to an extrusion port of an extrusion portion, the molding portion also comprising a screen arranged therein, wherein the molding portion comprises: a diameter increased part, a maximum diameter portion, two or more temperature controlling members between the screen and the die; and a heat insulating member arranged between the two or more temperature controlling members;

wherein a diameter of the diameter increased part increases in a direction from the other end to the maximum diameter portion directly connected to the diameter increased part at a position upstream from the screen, and the maximum diameter portion has the same diameter from the position upstream from the screen to a portion of the molding portion between a downstream side of the two or more temperature controlling members and an upstream side of the die; and wherein the extrusion molding machine is used for producing a ceramic honeycomb molded body.

2. The extrusion molding machine according to claim 1, wherein the molding portion further comprises a die holding member that holds the die and can control a temperature.

3. The extrusion molding machine according to claim 1, wherein the diameter increased part is provided with a temperature controlling member.

4. The extrusion molding machine according to claim 1, wherein each of the temperature controlling members is a temperature controlling drum through which a fluid can flow.

5. A method for producing a molded body by extruding a molding material using the extrusion molding machine according to claim 1, wherein the method comprises:

controlling the two or more temperature controlling members between the screen and the die to different temperatures.

6. The method according to claim 5, wherein a die holding member is controlled to the same temperature as that of the temperature controlling member located at the most downstream of the two or more temperature controlling members between the screen and the die.

7. An extrusion molding machine comprising a molding portion having one end and other end, the one end having a die, the other end being connected to an extrusion port of an extrusion portion, the molding portion also comprising a screen arranged therein, wherein the molding portion comprises: a diameter increased part, a maximum diameter portion, two or more temperature controlling members between the screen and the die; and a heat insulating member arranged between and directly in contact with the two or more temperature controlling members;

wherein a diameter of the diameter increased part increases in a direction from the other end to the maximum diameter portion directly connected to the diameter increased part at a position upstream from the screen, and the maximum diameter portion has the same diameter from the position upstream from the screen to a portion of the molding portion between a downstream side of the two or more temperature controlling members and an upstream side of the die; and wherein the heat insulating member has a thermal conductivity of 0.5 W/m·K or less.

* * * * *